(12) United States Patent
Sambasivam et al.

(10) Patent No.: US 10,579,621 B2
(45) Date of Patent: Mar. 3, 2020

(54) IMPLICIT QUERY GENERATION BASED ON PHYSICAL MOVEMENT

(71) Applicant: MICROSOFT TECHNOLOGY LICENSING, LLC, Redmond, WA (US)

(72) Inventors: Vaidyaraman Sambasivam, Redmond, WA (US); Nagendra Kolluru, Redmond, WA (US); Jie Liu, Medina, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 135 days.

(21) Appl. No.: 15/476,930

(22) Filed: Mar. 31, 2017

(65) Prior Publication Data

US 2018/0285422 A1 Oct. 4, 2018

(51) Int. Cl.
*G06F 17/30* (2006.01)
*G06F 16/2455* (2019.01)
(Continued)

(52) U.S. Cl.
CPC .... *G06F 16/2455* (2019.01); *G06F 16/24575* (2019.01); *G06Q 30/0256* (2013.01); *G06Q 30/0258* (2013.01); *G06Q 30/0259* (2013.01); *G06Q 30/0261* (2013.01); *G06Q 30/0269* (2013.01)

(58) Field of Classification Search
CPC ........... G06F 17/30477; G06F 16/2455; G06F 16/24575; G06Q 30/0256; G06Q 30/0258; G06Q 30/0259
See application file for complete search history.

(56) References Cited

U.S. PATENT DOCUMENTS 6,434,530 B1    8/2002  Sloane et al.
8,489,452 B1 *  7/2013  Warner .............. G06Q 30/0226
                                                705/14.34
(Continued)

FOREIGN PATENT DOCUMENTS

EP         2264659 A2    12/2010

OTHER PUBLICATIONS

Lindstrom, Martin, "Shopping Carts Will Track Consumers' Every Move", https://hbr.org/2011/12/shopping-carts-will-track-cons, Published on: Dec. 9, 2011, 4 pages.
(Continued)

*Primary Examiner* — Syed H Hasan
(74) *Attorney, Agent, or Firm* — International IP Law Group, PLLC

(57) ABSTRACT

Systems and methods, and other embodiments, for processing in-store events regarding the location of a mobile device user are presented. Data regarding a plurality of physical stores is maintained, where the data comprises, for each of the plurality of physical stores, a web site comprising a plurality of web pages, each web page corresponding to a location with the physical store. While a mobile device user is within a physical store, in-store events regarding the mobile device user are repeatedly received. A corresponding implicit request for a web page corresponding to location information of the in-store events is generated and supplemental content from the web page, returned in response to the implicit request, is presented to the mobile device user.

20 Claims, 8 Drawing Sheets

(51) Int. Cl.
  *G06Q 30/02* (2012.01)
  *G06F 16/2457* (2019.01)

(56) References Cited

U.S. PATENT DOCUMENTS

| | | | |
|---|---|---|---|
| 9,147,001 B1 | 9/2015 | Brewington et al. | |
| 2004/0073572 A1* | 4/2004 | Jiang | G06Q 30/0603 |
| 2008/0004951 A1 | 1/2008 | Huang et al. | |
| 2009/0112683 A1* | 4/2009 | Hamilton, II | G06Q 30/02 |
| | | | 705/7.32 |
| 2010/0179889 A1* | 7/2010 | Johnsmeyer | G06Q 10/087 |
| | | | 705/28 |
| 2011/0161136 A1* | 6/2011 | Faith | G06Q 30/0201 |
| | | | 705/7.29 |
| 2011/0251897 A1* | 10/2011 | Litvack | G06Q 30/02 |
| | | | 705/14.58 |
| 2012/0209749 A1* | 8/2012 | Hammad | G06Q 30/06 |
| | | | 705/27.1 |
| 2012/0265744 A1* | 10/2012 | Berkowitz | G06F 17/30873 |
| | | | 707/705 |
| 2012/0310769 A1* | 12/2012 | Lawrence | G06Q 30/02 |
| | | | 705/26.7 |
| 2013/0124361 A1* | 5/2013 | Bryson | G06Q 30/02 |
| | | | 705/26.7 |
| 2013/0282522 A1* | 10/2013 | Hassan | G06Q 10/087 |
| | | | 705/26.9 |
| 2014/0201001 A1* | 7/2014 | Rellas | G06Q 30/0607 |
| | | | 705/14.58 |
| 2015/0112790 A1 | 4/2015 | Wolinsky et al. | |
| 2015/0199716 A1 | 7/2015 | Gerard | |
| 2016/0012509 A1 | 1/2016 | Howard et al. | |
| 2016/0019603 A1* | 1/2016 | Reynolds | G06Q 30/0277 |
| | | | 705/14.73 |
| 2016/0171540 A1 | 6/2016 | Mangipudi et al. | |
| 2016/0239854 A1* | 8/2016 | Neal | H04L 67/22 |
| 2016/0267552 A1 | 9/2016 | Chandra | |
| 2018/0137560 A1* | 5/2018 | Chopra | G06Q 30/0643 |

OTHER PUBLICATIONS

"Shopper Location Analytics", http://www.coursaretail.com/, Retrieved on: Jan. 11, 2017, 3 pages.

* cited by examiner

IMPLICIT QUERY GENERATION BASED ON PHYSICAL MOVEMENT

BACKGROUND

The paradigm of viewing a web page that includes both desired content as well as potentially relevant and/or enticing advertisements is ubiquitous. More particularly, when a computer user requests content from a content provider, the content provider will facilitate an advertisement service to place an advertisement within a web page containing the requested content. Indeed, the requested content comprise any of textual content, image/graphic content, a webpage, a blog site, and the like, or could be search results prompted by a user generated search query. When the web page/content (including advertisement) is displayed to the requesting computer user, this advertisement display is considered an "impression," which may be a monetizable event. Subsequently, if the computer user were to interact with the advertisement, say by clicking on the advertisement, this interaction is considered a "click" or "click-through" event with regard to the advertisement, which may also be a monetizable event. As will be appreciated in the context of paid search implementations, a click is considered a clear user intent to interact with the advertisement/advertiser and therefore the advertising is more "performance based," especially in those contexts where impressions, alone, are not monetized. Still further, if the computer user were to complete some specific task, such as making a purchase as a result of interacting with the advertisement, this interaction/event is considered to be a "conversion." Impressions, clicks, and conversions are the events that constitute Key Performance Indicators/Metrics (KPIs), where, in general terms, the advertiser associated with the viewed advertisement is responsible for paying a fee corresponding to the type of event and performance of a given advertisement.

SUMMARY

The following Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

According to aspects of the disclosed subject matter, systems and methods, and other embodiments, for processing in-store events regarding the location of a mobile device user are presented. Data regarding a plurality of physical stores is maintained, where the data comprises, for each of the plurality of physical stores, a web site comprising a plurality of web pages, each web page corresponding to a location with the physical store. While a mobile device user is within a physical store, in-store events regarding the mobile device user are repeatedly received. A corresponding implicit request comprises queries for which a web page corresponding to location information of the in-store events is generated, with results based on a search query, and additional supplemental content is returned in response to the implicit query/request. The supplemental content from the implicit query/request is presented to the mobile device user.

According to various embodiments, a method for processing in-store events regarding the location of a mobile device user within a physical store is presented. Data regarding a plurality of physical stores is maintained, where the data includes, for each of the plurality of physical stores, modeled as a web site. Each of the web sites comprises a plurality of web pages, with each web page corresponding to a location with the physical store. A first in-store event regarding the mobile device user is received. Each in-store event, including the first in-store event, comprises identification information that identifies the mobile device user and location information identifying the location of the mobile device user within a physical store. The location information of the first in-store event is translated to a web site corresponding the physical store. Thereafter and repeatedly, a subsequent in-store event is received regarding the mobile device user's movements and/or activities. In response, an implicit set of queries/requests is generated according to the subsequent in-store event. The implicit request includes mapping the location information of the subsequent in-store event to a web page of the web site corresponding to the physical store. In addition to generating search results corresponding to the implicit query/request and other page level details, search results and supplemental content are also dynamically added to the mapped web page. The supplemental content is identified and provided to a mobile device associated with the mobile device user for presentation to the mobile device user.

According to additional aspects of the disclosed subject matter, computer-readable medium bearing computer-executable instructions is presented. In execution on computing system comprising at least a processor, the executed instructions carry out a method for processing in-store events regarding the location of a mobile device user within a physical store is presented. Data regarding a plurality of physical stores is maintained, where the data includes, for each of the plurality of physical stores, a web site. Each of the web sites comprises a plurality of web pages, with each web page corresponding to a location with the physical store. A first in-store event regarding the mobile device user is received. Each in-store event, including the first in-store event, comprises identification information that identifies the mobile device user and location information identifying the location of the mobile device user within a physical store. The location information of the first in-store event is translated to a web site corresponding the physical store. Thereafter and repeatedly, a subsequent in-store event is received regarding the mobile device user's movements and/or activities. In response, an implicit set of queries/requests is generated according to the subsequent in-store event. The implicit set of queries/requests includes mapping the location information of the subsequent in-store event to a web page of the web site corresponding to the physical store. In addition to generating search results corresponding to the implicit query/request and other page level details, search results and other supplemental content are also dynamically added to the mapped web page. The supplemental content is identified and provided to a mobile device associated with the mobile device user for presentation to the mobile device user.

According to still further aspects of the disclosed subject matter, a computer system for processing in-store events regarding the location of a mobile device user within a physical store is presented. The computer system comprises a processor and a memory, wherein the processor executes instructions stored in the memory as part of or in conjunction with additional components to process in-store events. The additional components include an executable web page retrieval module. In execution, the web page retrieval module receives a first in-store event regarding the mobile device user, where each in-store event, including the first in-store event, comprises identification information that identifies the mobile device user and location information identifying the location of the mobile device user within a physical store. The web page retrieval module translates the location information of the first in-store event to a web site corresponding the physical store. Thereafter, the web page retrieval module repeatedly, receives one or more subsequent in-store events regarding the mobile device user's movements and activities. For each subsequent in-store event, an implicit query/request is generated according to the subsequent in-store event. Each implicit request includes mapping the location information of the subsequent in-store event to a web page of the web site corresponding to the physical store, and obtaining the mapped web page from the web site corresponding to the physical store. In response to the implicit request, search results and supplemental content is dynamically added to the mapped web page. The supplemental content is identified and provided to a mobile device associated with the mobile device user for presentation to the mobile device user.

BRIEF DESCRIPTION OF THE DRAWINGS

The foregoing aspects and many of the attendant advantages of the disclosed subject matter will become more readily appreciated as they are better understood by reference to the following description when taken in conjunction with the following drawings, wherein.

DETAILED DESCRIPTION

Figure 1A:
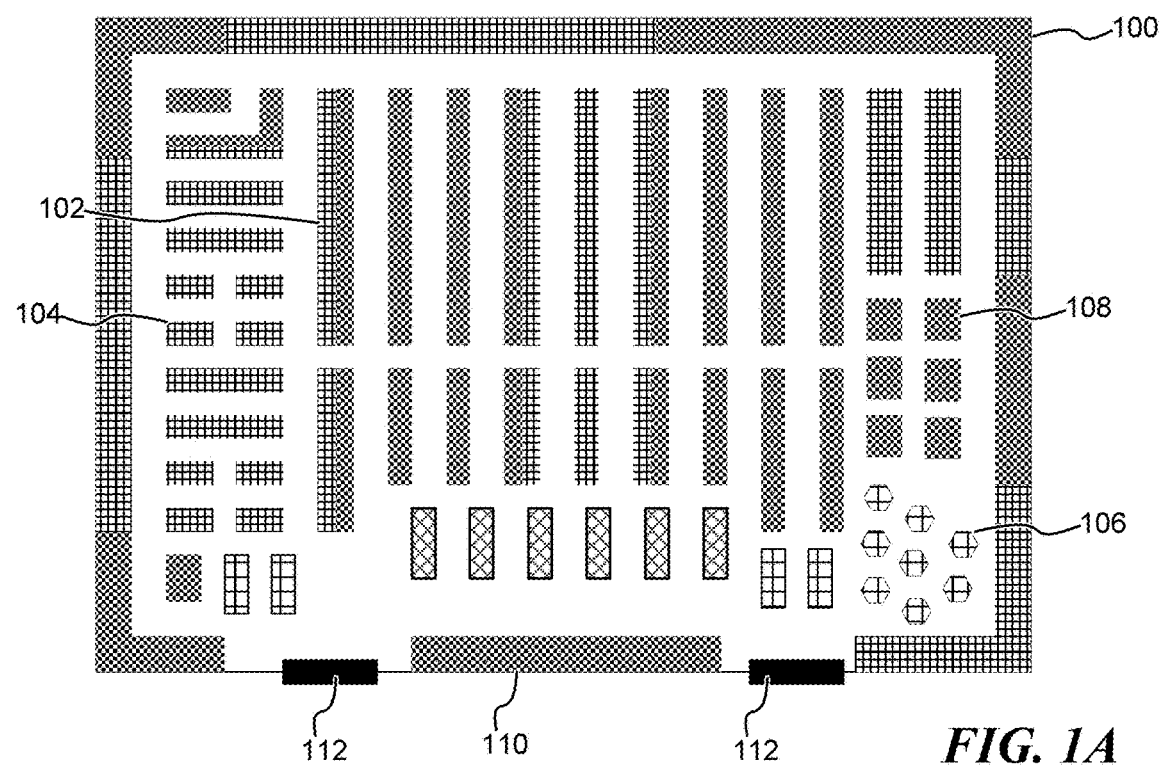
FIGS. 1A and 1B are pictorial diagrams illustrating a 2-dimensional layout of an exemplary physical store.

For purposes of clarity and definition, the term "exemplary," as used in this document, should be interpreted as serving as an illustration or example of something, and it should not be interpreted as an ideal or a leading illustration of that thing. Stylistically, when a word or term is followed by "(s)", the meaning should be interpreted as indicating the singular or the plural form of the word or term, depending on whether there is one instance of the term/item or whether there is one or multiple instances of the term/item. For example, the term "user(s)" should be interpreted as one or more users.

As discussed above, while the paradigm with regard to retrieving web pages of a web site is well established, utilizing search engines to obtain search results, as well as obtaining and incorporating "additional" content within the web page such as advertisements, the analog to the physical world has not existed. Indeed, while a content provider may utilize an advertisement service to provide the additional content to a web page (i.e., content that is not placed in a web page by the content provider, but instead identified and supplied by a third party advertisement service), there is no current analog in the physical world.

According to aspects of the disclosed subject matter, a physical store corresponds to a web site, where the web pages of that web site correspond to distinct areas or tiles or locations within the physical store, and where each web page identifies the products and/or services that are available at a specified location within the physical store. As a person/mobile device user navigates within the physical store, "in-store events" are generated with regard to the current location of the mobile device user. In-store events may be generated when a person enters a physical store, pauses at a particular location, also referred to as a tile or hot-spot, within the physical store, moves within the physical store, is at a hot-spot corresponding to a check-out/point-of-sale terminal within the physical store, leaves the physical store, and the like. These in-store events are provided to a host service (typically though not exclusively operating as a remote service on a network) that maps the in-store events to a web page (and consequently maps to implicit queries) corresponding to the mobile devices user's location and utilizes various information to identify "supplemental data" to be presented to the mobile device user by way of the mobile device. By way of illustration and not limitation, the supplemental data may include advertisements, coupons, loyalty reward information, product suggestions, reminders, and the like. According to aspects of the disclosed subject matter, the supplemental data presented to the mobile device user may be obtained from a third-party advertisement service. By utilizing web pages and third-party advertisement services, existing technology regarding serving advertisements and/or other content to a user in a paid advertisement system can be leveraged to physical locations, such as physical stores.

As part of the correspondence between a physical store and a web site comprising a plurality of web pages, a mapping of the physical store is generated/provided. More particularly, the products and/or services of each hot-spot/tile/location within a store are identified and this information is encoded within a web page (of the web site) corresponding to that hot-spot/tile/location. By way of illustration, reference is made to the figures. In particular, FIG. 1A is a pictorial diagram illustrating a 2-dimensional lay-out of an exemplary physical store 100. By way of explanation and illustration, the shaded, darkened areas of the physical store 100 indicate a structure: e.g., stands, tables, counters, cabinets, display cases, desks, refrigerators, doors, etc. As shown in FIG. 1A, the physical store 100 includes structures display case 102, produce table 104, bakery table 108, dining table 106, service desk 110, and entry/exit doors 112. In contrast to the various structures within the physical store 100, the blank areas represent open space and/or walking paths.

Figure 1B:
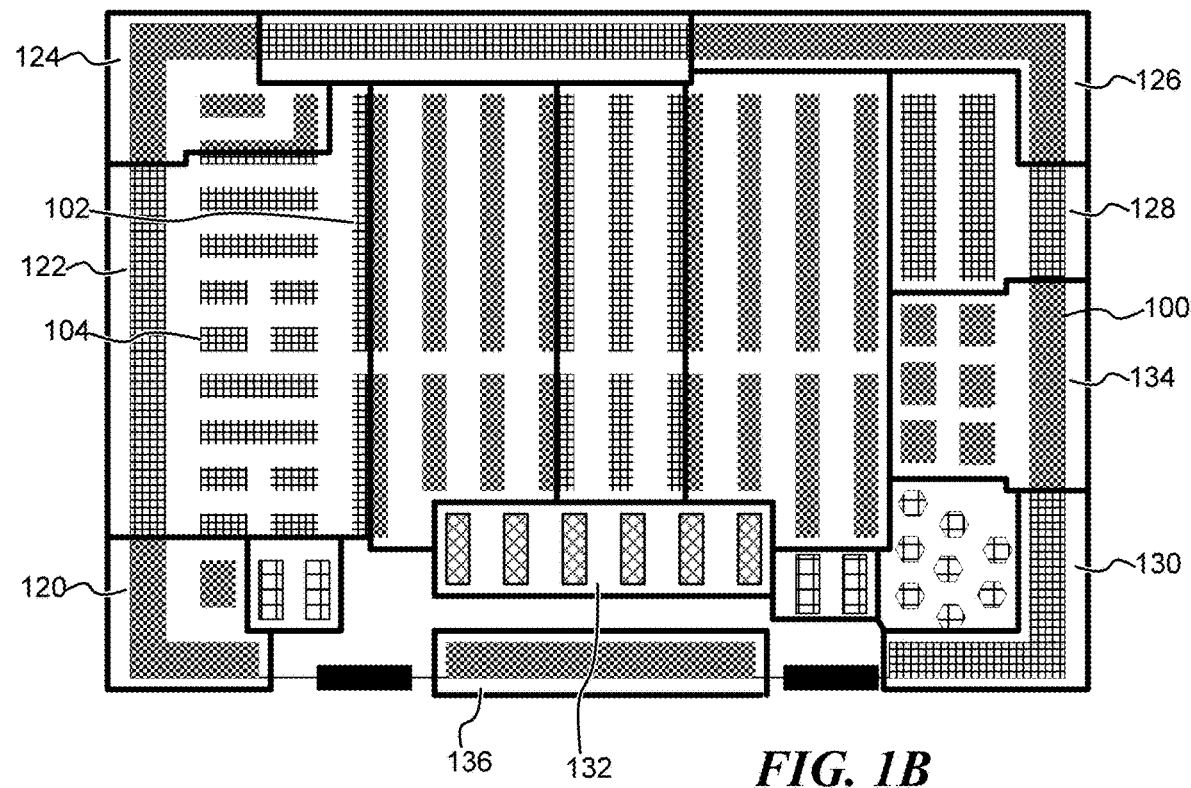

Of course, the various structures are typically, though not exclusively, present products, goods and/or services corresponding to a particular department within a given physical store. For example, FIG. 1B is a pictorial diagram illustrating the exemplary physical store 100 of FIG. 1A, overlaid with borders illustrating exemplary departments (and areas) within the physical store. For example and by way of illustration and not limitation, these departments include a florist department 120, a product department 122, a pharmacy 124, a dairy department 126, a wines and liquor department 128, a deli and hot foods department 130, a checkout area 132, a baked goods department 134, and a service desk area/department 130. By segregating a physical store into departments, and correlating the locations/tiles/hot-spots within the physical store to those departments, greater tracking and user targeting may be accomplished.

Figure 2:
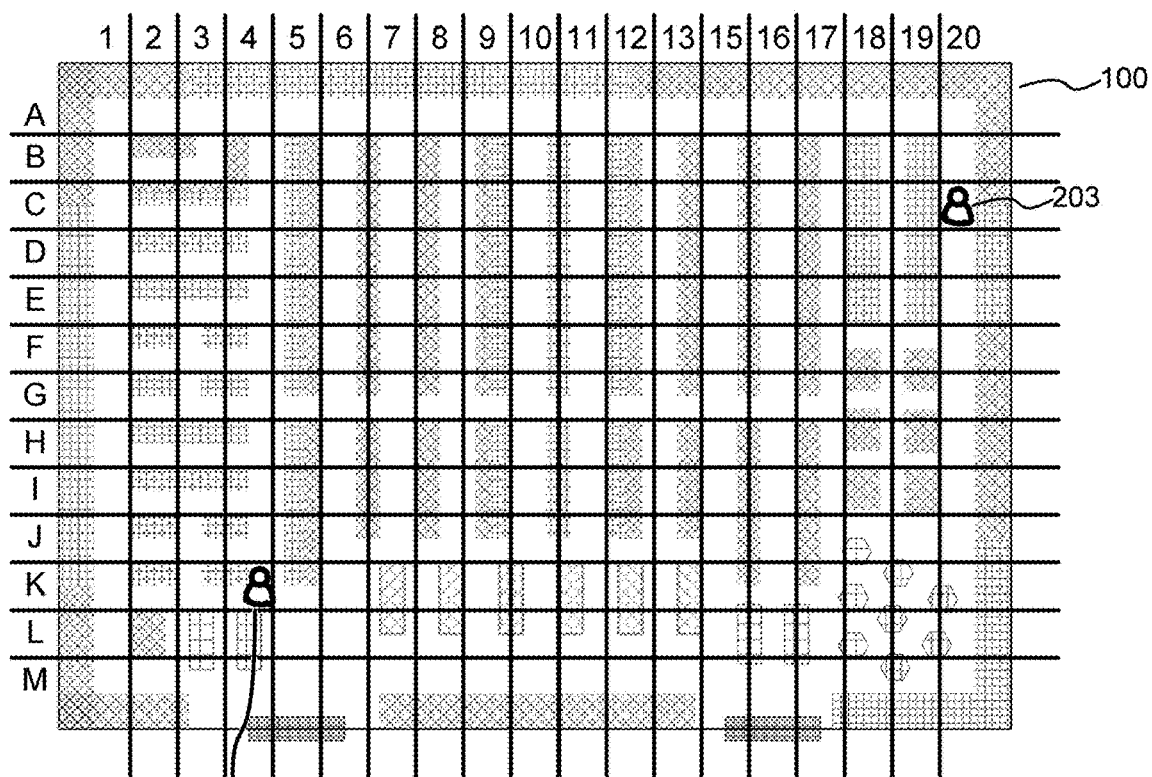
FIG. 2 is a pictorial diagram of an exemplary web page grid overlaying the exemplary physical store layout.

In regard to the various locations/hot-spots within the physical store, reference is now made to FIG. 2. Indeed, FIG. 2 is a pictorial diagram of an exemplary web page grid overlaying the exemplary physical store layout 100. As can be seen, the exemplary physical store layout 100 has been overlaid with grid that includes 20 columns and 13 rows, for a total of 260 locations/tiles/hot-spots within the physical store. As indicated above and for purposes of clarity and definition, an area of the physical store as identified by the overlaying web page grid is referred to as a tile or hotspot. According to aspects of the disclosed subject matter and as suggested above, each grid-defined location/hot-spot within the store is associated with a web page within the set of web pages maintained for the physical store. Moreover, information regarding the various products, goods and/or services that are immediately available to a consumer at a grid-defined location are included within (or, alternatively, associated with) the web page for that location. In this manner, when obtaining supplemental content for display to a mobile device user, information regarding the immediate products, goods and/or services is also readily available and can be considered in the identification/selection of the supplemental content.

According to aspects of the disclosed subject matter, through the use of one or more location determination services, the particular location of a mobile device user is mapped to a corresponding web page for that location. Upon certain conditions relating to the location of the user within the physical store, various in-store events are generated. These in-store events include the current location of the mobile device user as well as context regarding the mobile device user (i.e., stationary, moving, etc.) The conditions that are the basis of the in-store events includes, by way of illustration and not limitation, when the mobile device user has paused for some determined period of time at a particular location, while the mobile device user is moving/transitioning from one area to another, as the mobile device user enters or exits the physical store, while present at a checkout terminal, and the like.

According to aspects of the disclosed subject matter, an in-store event generates an implicit REST (Representational state transfer) query/request for a web page; particularly the web page corresponding to the current location of the mobile device user. In addition to accessing the corresponding web page, additional supplemental content, such as advertisements, coupons, reminders, etc. may be associated with the web page. Moreover, in response to the REST query/request, search results, coupons/offers and/or other supplemental content may be presented to the mobile device user on the mobile device.

By way of example, as mobile device user 201 pauses by a produce structure/table in the product area to inspect and/or acquire some product that that structure, an in-store event is triggered. This in-store event causes an implicit REST request for the web page corresponding to mobile device user's current location, identified as tile or hotspot K4 (i.e., the web page associated with row K/column 4) within the web site for the physical store 100. Upon retrieving the web page, supplemental content is included with web page.

Upon receipt of the K4 web page with the supplemental content or, alternatively, upon receipt of the supplemental content without the K4 web page, the supplemental content is presented to mobile device user 201 on the user's mobile device. Further still, as the supplemental content is presented on the user's mobile device, the presentation of the content may be counted as an "impression" for any advertisement billing purposes. Similarly, as mobile device user 203 inspects bottled spirits in the wine/liquor department, an in-store event causes an implicit request to be generated with regard to the C20 web page. In response, supplemental content may be presented on the mobile device of user 203.

Figure 3:
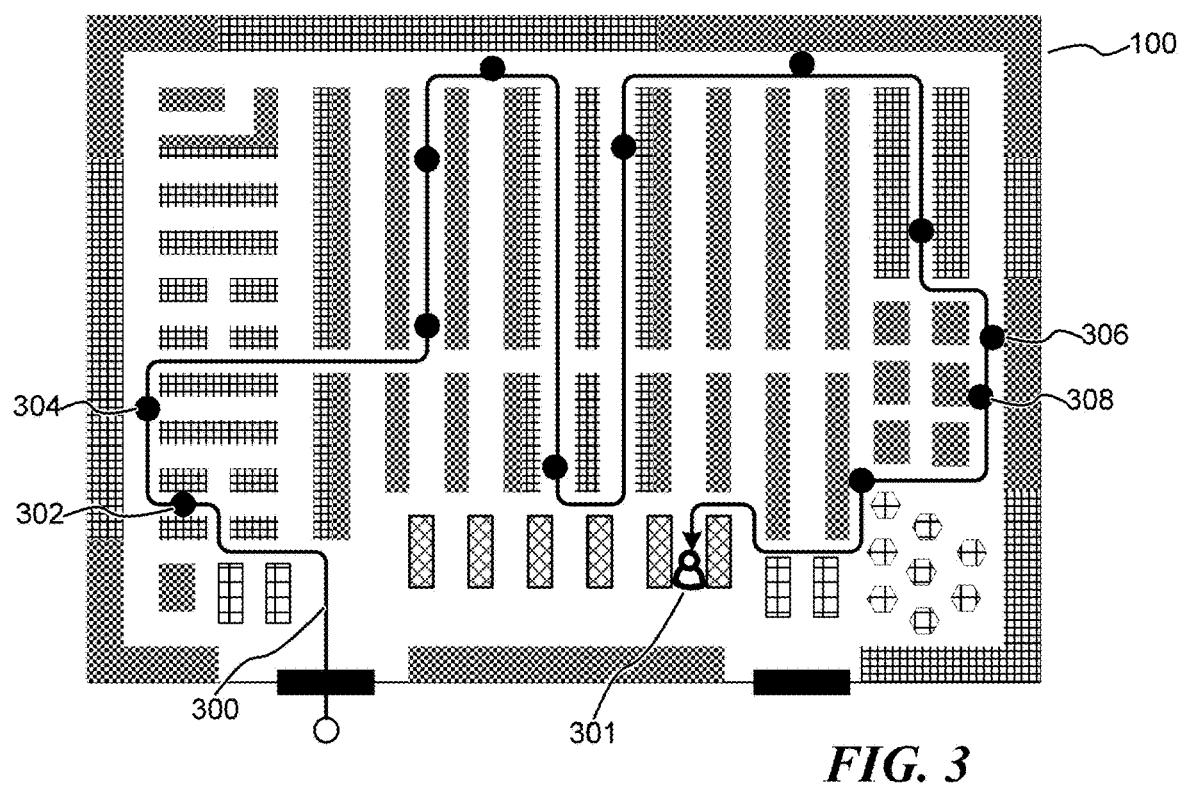
FIG. 3 is a pictorial diagram of an exemplary navigation of a user through the exemplary physical store layout.

As a participating consumer/user (i.e., a mobile device user whose device is configured to interact with the tracking of the device—and correspondingly the mobile device user—through the store) navigates through the physical store, the movements, as well as lack of movements, trigger in-store event corresponding to the current location of the user. FIG. 3 is a pictorial diagram of an exemplary navigation of a user within the exemplary physical store layout 100. The winding, directional line represents the travel path 300 of mobile device user 301 throughout the physical store (as represented by the exemplary physical store layout 100) with the heavy dots corresponding to locations in which mobile device user 301 paused for at least some predetermined amount of time. For example, according to the user's travel path, stopped at various locations including location 302 and 304 in the produce department, locations 306 and 308 in the baked goods department, and is currently waiting in the checkout area.

Figure 4A:
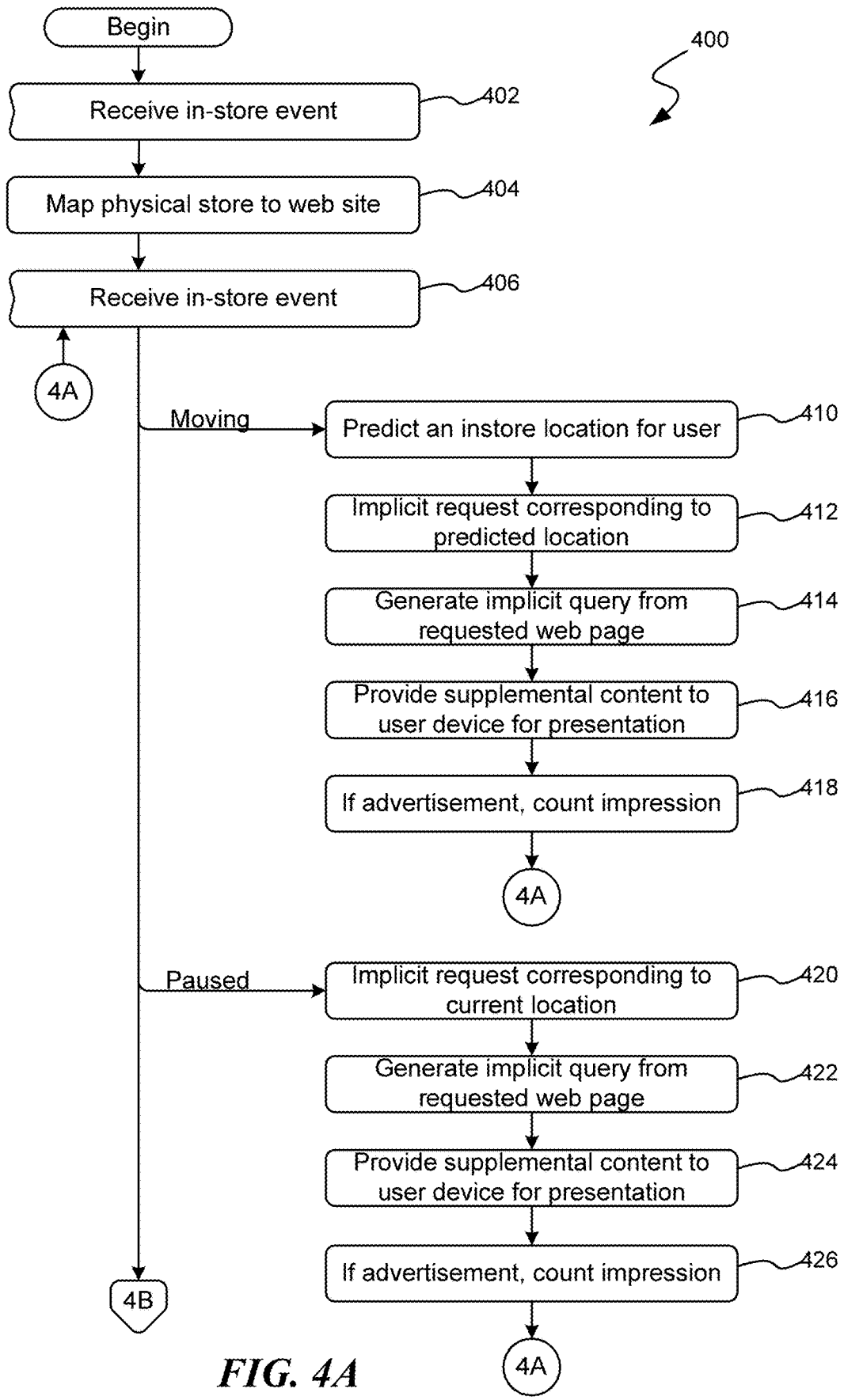
FIGS. 4A and 4B illustrate a flow diagram of an exemplary routine for processing in-store events in accordance with aspects of the disclosed subject matter.
Figure 4B:
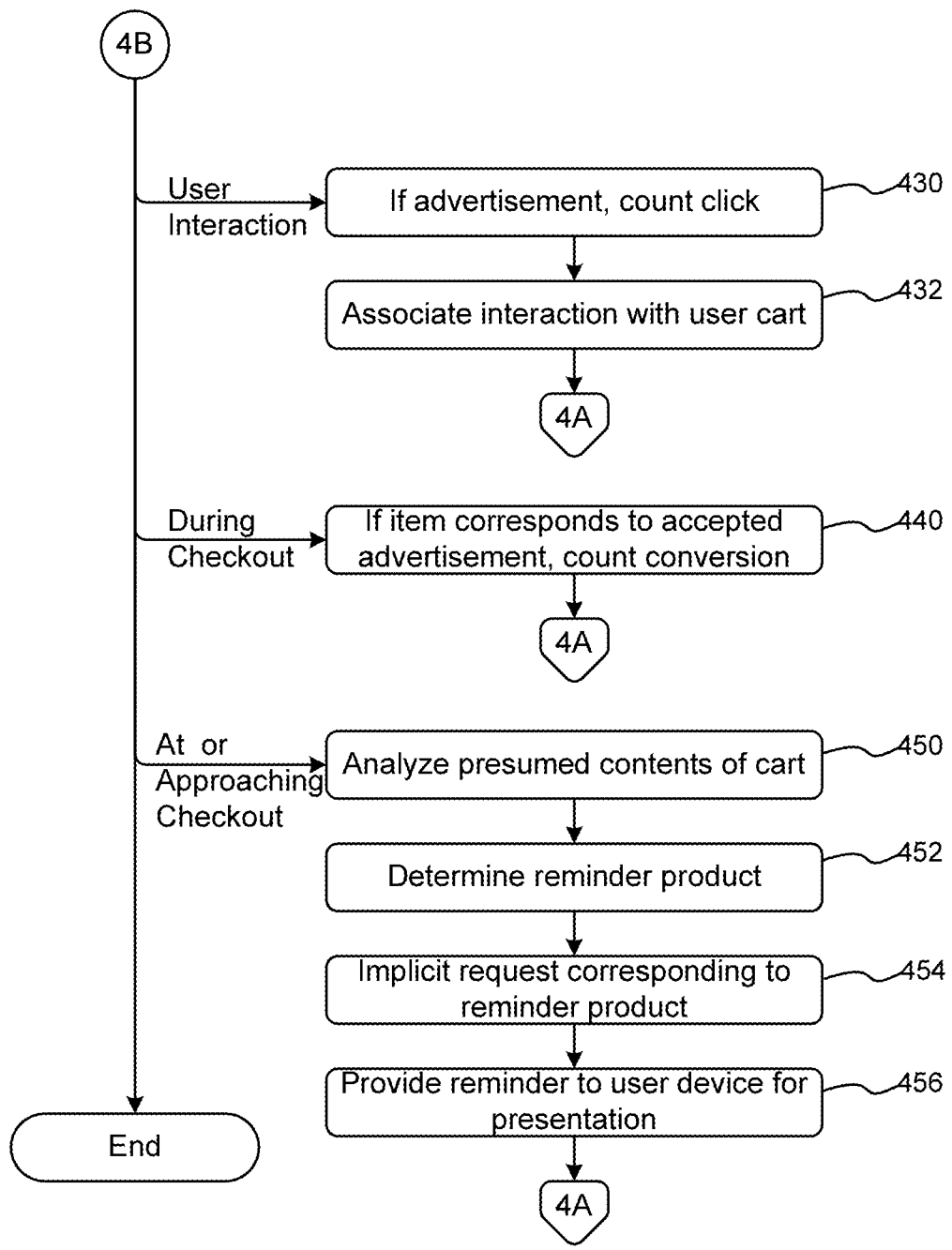

Turning to FIGS. 4A-B, FIGS. 4A and 4B illustrate a flow diagram of an exemplary routine 400 for processing in-store events in accordance with aspects of the disclosed subject matter. Beginning at block 402, an in-store event is received regarding the presence of a mobile device user within a physical store. According to aspects of the disclosed subject matter, the in-store event may be received from a user's mobile device which was generated upon entry of a physical store or from a service that is configured to detect the presence of the mobile device (and, by implication, the mobile device user) within the physical store. As suggested above, this in-store event will typically include the identity of the mobile device user, the location of the mobile device user within the physical store, as well as an identification of the physical store.

The presence (as well as movement) of the mobile device user within the physical store may be made according to a variety of detection mechanisms. By way of illustration and not limitation, an executing process on the mobile device may monitor for or have conditions set with regard to geolocation positioning services to trigger and take action upon detecting the presence of the device within the geolocation of the physical store. The action may include transmitting to a receiving service an indication that the mobile device user (per a user identifier and a position/geolocation of the user) is within a physical store. Information regarding the identity of the physical store may be included with the transmitted message, or the identity of the physical store may be determined or already known by the receiving service. As another alternative, an executing process on the mobile device may detect a signal broadcast within or around the physical store to trigger tracking of the mobile device as well as communicating the mobile device's geo-location within the physical store. As yet another alternative, the physical store may include services that detect the presence and position of the mobile device and utilizes its own geo-locating services to determine and track the location of the mobile device within the physical store. In many but not all of the variations of geolocation tracking options, an in-store event based on a user's movements and activities within the physical store is a product of a cooperation between the user's mobile device and locations systems within the physical store in order to generate an in-store event.

At block 404, upon receiving the in-store event indicating the mobile device user's presence in the store, a mapping from the information in the in-store event to the corresponding web site of the physical store may be needed. For example, based on the identifier of the physical store, a particular web site (comprising web pages for each of a plurality of locations/tiles/hot-spots within the physical store) is identified. Moreover, upon mapping of the physical store to the web site, a first location of the mobile device user can be established and the corresponding web page for that location may be retrieved with regard to the current/initial location. Indeed, this may trigger the presentation of supplemental content to the mobile device user, by way of the user's mobile device, as will be described in greater detail below.

At block 406, an in-store event regarding the mobile device user is received. As indicated above, the in-store event may indicate that the mobile device user has paused at a particular location within some department or at some display in the physical store, is moving within the store, is in a check-out line or region, and the like. Thus, depending on the particular nature of the in-store event, from block 406 the routine 400 proceeds to any of block 410, 420, 430, 440 or 450.

In the case that the in-store event corresponds to a condition that the mobile device user is moving within the physical store, the routine 400 proceeds to block 410. At block 410, based on a variety of potential conditions, a predicted location within the store for the mobile device user is determined. This predicted location may be based on any number of criteria including, by way of illustration and not limitation, direction of travel within the physical store, origin of current travel and/or prior locations within the physical store (current trip), coupons applied to the user's shopping cart, locations that the mobile device user has historically visited, current contents of the mobile device user's shopping cart (or estimated contents of the shopping cart), personal preferences, prior visits to other physical stores, and the like.

After determining a predicted in-store location, at block 412 an implicit request, made on behalf of the mobile device user, is issued. According to aspects of the disclosed subject matter, an implicit request is a request of a web page of the web site as determined according to location information of the in-store event. In the case of an in-store event corresponding to a predicted location, the web page that is retrieved is the web page corresponding to the predicted location. The web page of the predicted physical location, in turn, leads to a set of implicit queries submitted to a search engine based on information that corresponds to that predicted location. Thus, in block 414, one or more implicit queries are generated based on the contents of the retrieved web page, the implicit queries resulting in supplemental content (e.g., search results, advertisements, reminders, coupons, loyalty reward information, etc.) In the case of an in-store event based on a user's pause at a location within the physical store, the web page that is retrieved is the web page corresponding to the "paused" location within the physical store and supplemental content is obtained based on the implicit queries generated from information within the retrieved web pages. In short, the implicit request made on behalf of the mobile device user is determined according to a physical location within the physical store, and further according to the type of action that generated the in-store event.

According to aspects of the disclosed subject matter, while the contents of a given web page (corresponding to a physical location within a physical store) are generally fixed, supplemental content, such as advertisements, in-store specials, reminders, and the like, are dynamically added to the web page. As indicated above, this web page, in turn, leads to a set of implicit queries that are unique to that page and, therefore, to that physical location. Advantageously, by obtaining web pages (and supplemental content) in this manner, and subsequently converting the contents of the web pages into one or more implicit queries, services such as typical online advertisement services can be utilized and leveraged. Indeed, these online services, which may include third-party online services, already exist to dynamically additionally/supplemental content to a web page, such as advertisements. Further and in regard to advertisements, this supplemental content may be based on currently established advertisement campaigns that, of themselves, require substantial infrastructure and management and which is almost always out of the capacity of a store or chain of stores to manage and maintain. The launching of implicit queries allows the usage of search engine technology and associated advertisement service technology After obtaining the web page corresponding to the predicted location, which includes supplemental content, at block 416, the supplemental content resulting from the implicit queries generated based on the subject matter of the web page is provided to the user's mobile device for presentation to the mobile device user. At block 418, optionally, if the supplemental content provided to the user's mobile device is an advertisement, or other content that is monetized in a manner similar to advertisements, the provision of the supplemental content is counted as an advertisement "impression," meaning that the advertisement has been displayed to the mobile device user.

Figure 5A:
FIGS. 5A-5D are pictorial diagrams illustrating exemplary presentations to a computer user by way of a mobile computing device.

By way of illustration and not limitation, and with additional reference to FIG. 5A, assuming that the predicted location within the physical store corresponds to an area in the produce department 122, the exemplary supplemental content presented on a mobile device 500 to the mobile device user may include the presentation of advertisement 502 to the mobile device user. Alternatively and with reference to FIG. 5B, the exemplary supplemental content presented to the mobile device user may include the presentation presented on the mobile device 500 to of an in-store price reduction 512. Of course, these are simply illustrative of any number of embodiments of supplemental content that may be presented to the mobile device user while within a physical store. Thereafter, the routine 400 returns (through circle 4A) to block 406 where additional in-store events are processed.

In the case that the in-store event corresponds to a condition that the mobile device user is paused (for some predetermined threshold amount of time, such as 5 second for example), the routine 400 proceeds to block 420. At block 420, an implicit request, made on behalf of the mobile device user, is issued where the request is for the web page corresponding to the current location of the mobile device user within the physical store. At block 422, based upon the content of the requested web page, one or more implicit queries are generated and, in response, receiving the corresponding the supplemental content. At block 424, the supplemental content is then provided to the user's mobile device for presentation to the mobile device user. At block 426, optionally, if the supplemental content provided to the user's mobile device is an advertisement, or other content that is monetized in a manner similar to advertisements, the provision of the supplemental content is counted as an advertisement "impression."

Figure 5B:

As above in regard to predicted locations, the contents of FIGS. 5A and 5B may be suitably applicable to in-store events corresponding to detecting a pause in the mobile device user's navigation of the physical store. For example, if the mobile device user is paused within the produce department 122 at display structure 104, the display of advertisement 502 may be advantageous. Similarly, if the user is paused in soft drinks department, then the display of the in-store price reduction 512 may be warranted. In any event, the determination of the supplemental content to display to the mobile device user is determined in the process of retrieving a web page for the user in response to an implicit request. Thereafter, the routine 400 returns (through circle 4A) to block 406 where additional in-store events are processed.

In addition to detecting movement within the physical store, or detecting a pause at a particular display structure within the physical store, other conditions may also be detected. The additional in-store conditions include, by way of illustration and not limitation, a user interaction with presented supplemental content (e.g., user interaction with an advertisement, loyalty reward reminder, etc.), utilizing a coupon at check-out time, waiting in line or approaching the check-out area of the store, and the like.

Figure 5C:
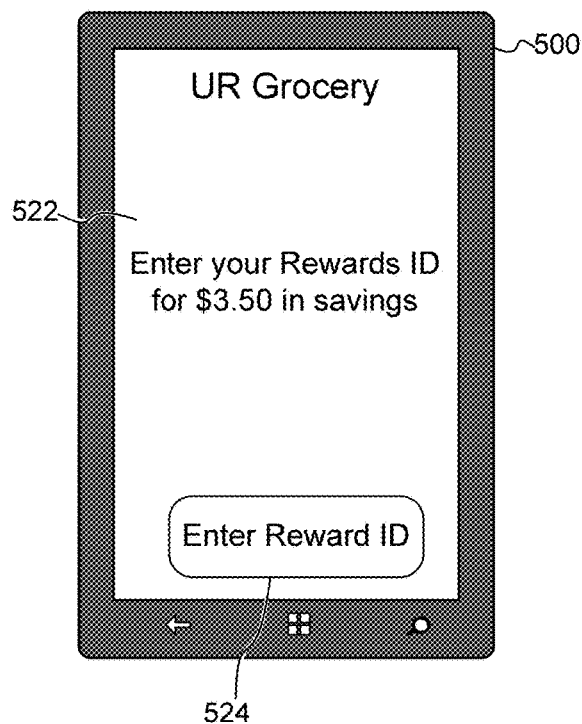

In the case that the in-store event corresponds to a condition that the mobile device user is interacting with the supplemental content, the routine 400 proceeds to block 430. In this circumstance, at block 430 if the supplemental content corresponds to an advertisement, or other monetizable display of content, the user interaction is counted as a "click," representing an additional level of user interaction above that of simply displaying the content to the mobile device user (i.e., the impression.) For example, the mobile device user may be accepting a coupon or discount, or the user may agree to buy two units of a particular item to get a discount. By way of illustration and with reference to FIGS. 5A, 5B, and 5C, the user interaction may correspond to any of interacting with the "Apply Coupon" user control 504, or the "Enter Reward ID" user control 514, or interaction with the "Enter Reward ID" user control 524 of reminder content 522.

At block 432 and according to aspects of the disclosed subject matter, the user interaction is associated with the current shopping cart. This may include retaining the mobile device user's ID for check-out purposes, indicating that a coupon is to be applied at check-out, and the like. Thereafter, the routine 400 returns to block 406 (by way of circle 4A) for processing of additional in-store events.

In the case that the in-store event is generated during a check-out process, if an item being purchased corresponds to an "applied" advertisement or other monetizable supplemental content (as discussed above in regard to blocks 430 and 432), at block 440 the supplemental content is counted as a "conversion," i.e., the impression is converted into a transaction. This indicates the completion of a purchase or transaction, i.e., more than the acceptance of the coupon/discount. Thereafter, the routine 400 returns to block 406 for processing of additional in-store events.

Figure 5D:
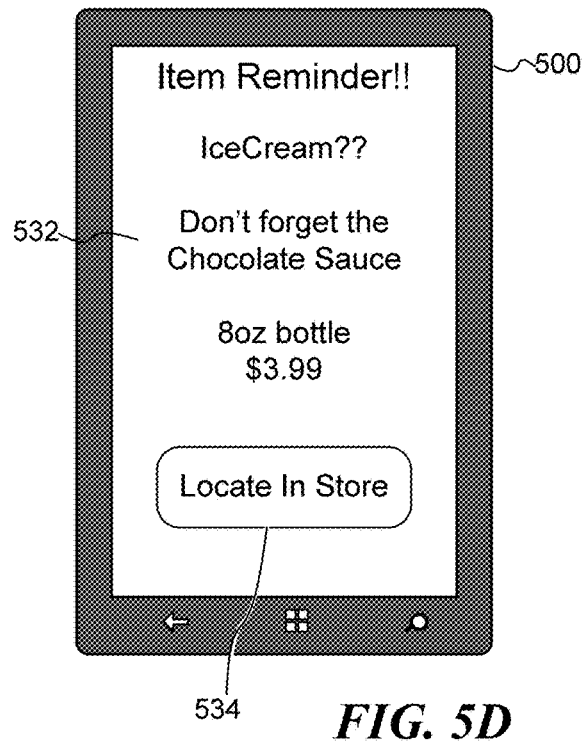

In the case that the in-store event is generated while approaching the check-out area of the physical store, or while waiting in the check-out area of the physical store, at block 450 an analysis of the presumed contents of the mobile device user's shopping cart (as may be determined by the accepted reminders, coupons, navigation path through the physical store, and the like) to identify any additional items that may be desired of the user. At block 452, the reminder product is determined. At block 454, an implicit request corresponding to the reminder product is made. While an advertisement may be presented as the supplemental content, in this circumstance a reminder may also be presented. With reference to FIG. 5D, the supplemental content of the obtained web page may include product reminder 532 regarding a suggested product as well as a user control 534 for locating the product within the physical store. Of course, a combination of an advertisement and reminder (or other combinations) may be presented. While not show in FIG. 4, if the reminder content is an advertisement, an impression may also be counted. Thereafter, the routine 400 returns to block 406 for additional processing.

At block 406, if the additional in-store event corresponds to an exit the store event, the routine 400 terminates (via circle 4B).

Regarding routine 400 described above, while this routine/process is expressed in regard to discrete steps, these steps should be viewed as being logical in nature and may or may not correspond to any specific actual and/or discrete execution steps of a given implementation. Also, the order in which these steps are presented in routine 400, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while routine 400 includes various novel features of the disclosed subject matter, other steps (not listed) may also be included and carried out in the execution of the subject matter set forth in these routines. Those skilled in the art will appreciate that the logical steps of these routines may be combined together or be comprised of multiple steps. Steps of the above-described routines may be carried out in parallel or in series. Often, but not exclusively, the functionality of the various routines is embodied in software (e.g., applications, system services, libraries, and the like) that is executed on one or more processors of computing devices, such as the computing device described in regard FIG. 6 below. Additionally, in various embodiments all or some of the various routines may also be embodied in executable hardware modules including, but not limited to, system on chips (SoC's), codecs, specially designed processors and or logic circuits, and the like on a computer system.

As suggested above, routines and/or executable processes are typically comprised of executable code modules comprising routines, functions, looping structures, selectors and switches such as if-then and if-then-else statements, assignments, arithmetic computations, and the like that, in execution, configure a computing device to operate in accordance with the routines/processes. However, the exact implementation in executable statement of each of the routines is based on various implementation configurations and decisions, including programming languages, compilers, target processors, operating environments, and the linking or binding operation. Those skilled in the art will readily appreciate that the logical steps identified in these routines may be implemented in any number of ways and, thus, the logical descriptions set forth above are sufficiently enabling to achieve similar results.

While many novel aspects of the disclosed subject matter are expressed in routines embodied within applications (also referred to as computer programs), apps (small, generally single or narrow purposed applications), and/or methods, these aspects may also be embodied as computer executable instructions stored by computer readable media, also referred to as computer readable storage media, which are articles of manufacture. As those skilled in the art will recognize, computer readable media can host, store and/or reproduce computer executable instructions and data for later retrieval and/or execution. When the computer executable instructions that are hosted or stored on the computer readable storage devices are executed by a processor of a computing device, the execution thereof causes, configures and/or adapts the executing computing device to carry out various steps, methods and/or functionality, including those steps, methods, and routines described above in regard to the various illustrated routines and/or processes. Examples of computer readable media include, but are not limited to: optical storage media such as Blu-ray discs, digital video discs (DVDs), compact discs (CDs), optical disc cartridges, and the like; magnetic storage media including hard disk drives, floppy disks, magnetic tape, and the like; memory storage devices such as random access memory (RAM), read-only memory (ROM), memory cards, thumb drives, and the like; cloud storage (i.e., an online storage service); and the like. Additionally, while computer readable media may reproduce and/or cause to deliver the computer executable instructions and data to a computing device for execution by one or more processors via various transmission means and mediums, including carrier waves and/or propagated signals, for purposes of this disclosure computer readable media expressly excludes carrier waves and/or propagated signals.

Figure 6:
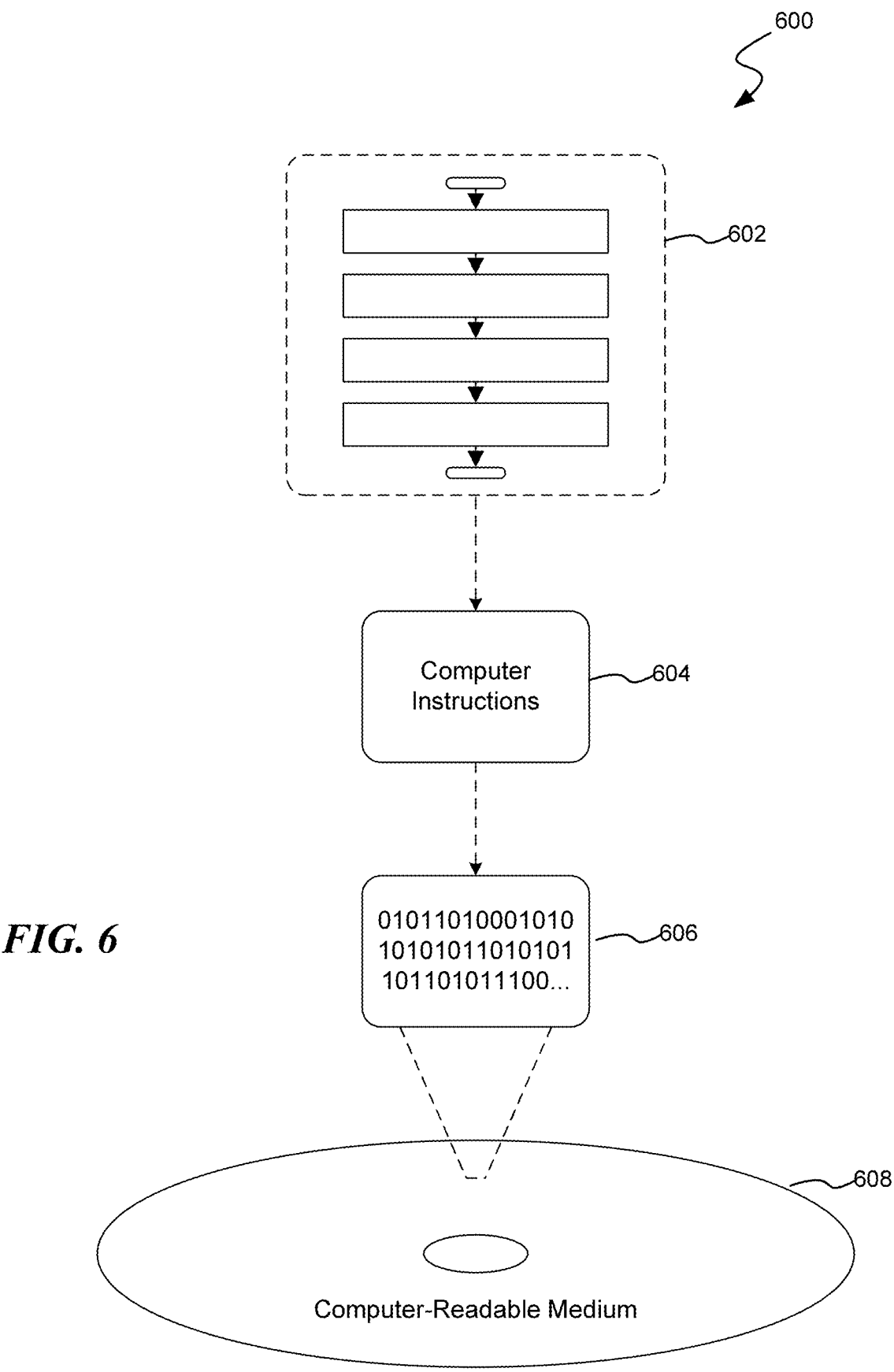
FIG. 6 is a block diagram illustrating an exemplary computer readable medium encoded with instructions for processing in-store events as set forth in FIGS. 4A and 4B.

In regard to computer readable media, FIG. 6 is a block diagram illustrating an exemplary computer readable medium encoded with instructions to process in-store events, as described above. More particularly, the implementation 600 comprises a computer-readable medium 608 (e.g., a CD-R, DVD-R or a platter of a hard disk drive), on which is encoded computer-readable data 606. This computer-readable data 606 in turn comprises a set of computer instructions 604 configured to operate according to one or more of the principles set forth herein. In one such embodiment 602, the processor-executable instructions 604 may be configured to perform a method, such as at least some of exemplary method 400, for example. In another such embodiment, the processor-executable instructions 604 may be configured to implement a system, such as at least some of the exemplary system 700, as described below. Many such computer readable media may be devised, by those of ordinary skill in the art, which are configured to operate in accordance with the techniques presented herein.

Figure 7:
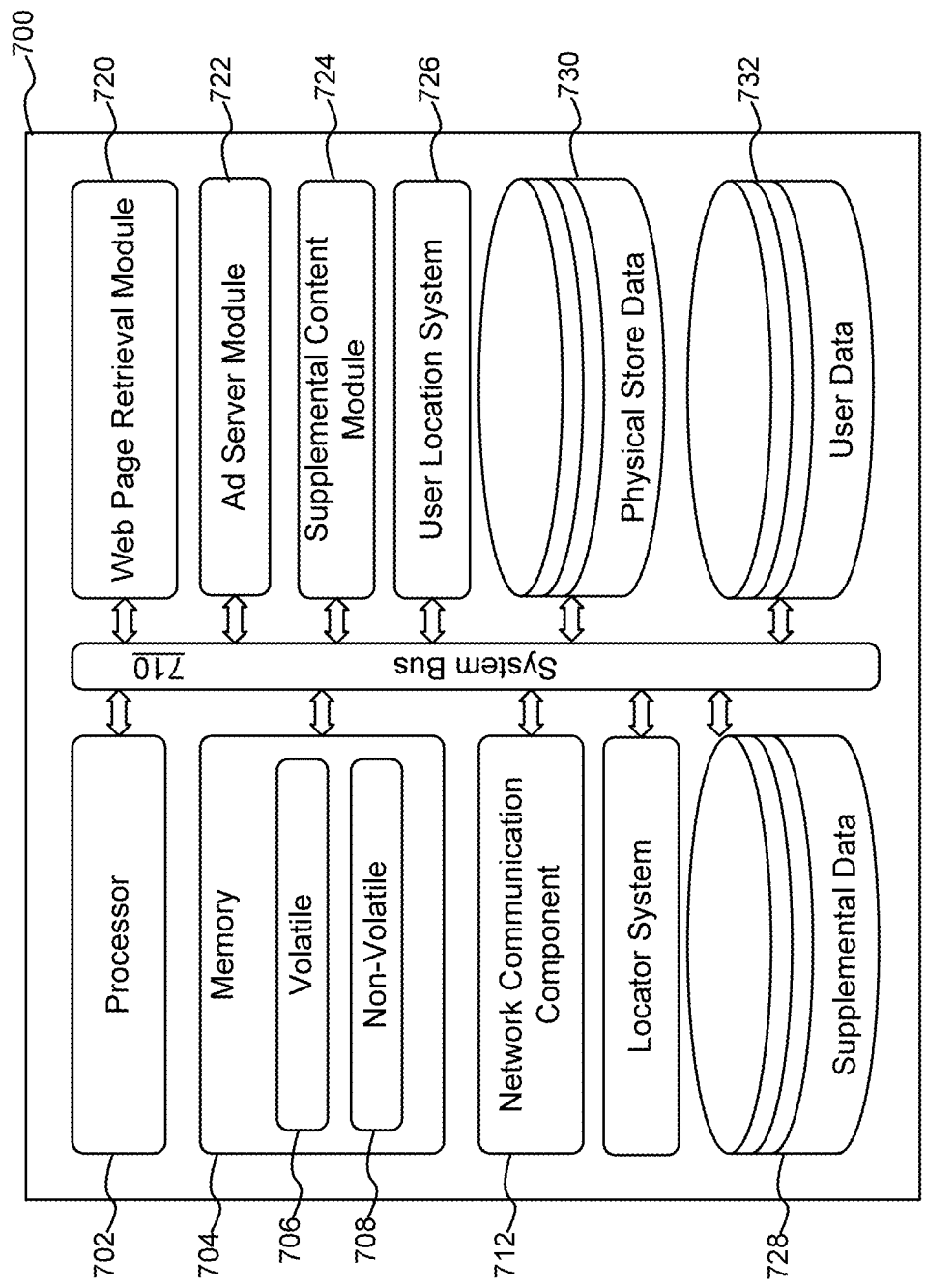
FIG. 7 is a block diagram illustrating an exemplary computing device suitably configured for processing in-store events of a user with regard to a physical store and in accordance with aspects of the disclosed subject matter.

Turning now to FIG. 7, FIG. 7 is a block diagram illustrating an exemplary computing device 700 suitably configured for processing in-store events of a user with regard to a physical store and in accordance with aspects of the disclosed subject matter. The exemplary computing device 700, collectively implementing a store processing server, includes one or more processors (or processing units), such as processor 702, and a memory 704. The processor 702 and memory 704, as well as other components, are interconnected by way of a system bus 710. The memory 704 typically (but not always) comprises both volatile memory 706 and non-volatile memory 708. By way of definition, volatile memory 706 retains or stores information so long as the memory is supplied with power. In contrast, non-volatile memory 708 is capable of storing (or persisting) information even when an external power source is not available. Generally speaking, RAM and CPU cache memory are examples of volatile memory 706 whereas ROM, solid-state memory devices, memory storage devices, and/or memory cards are examples of non-volatile memory 708.

As will be appreciated by those skilled in the art, the processor 702 executes instructions retrieved from the memory 704 (and/or from computer readable media, such as computer readable media 600 of FIG. 6) in carrying out various functions of providing an action delegation agent that identifies and delegates actions to action completion bots based on received content, as set forth above. The processor 702 may be comprised of any of a number of available processors such as single-processor, multi-processor, single-core units, and multi-core units.

Figure 8:
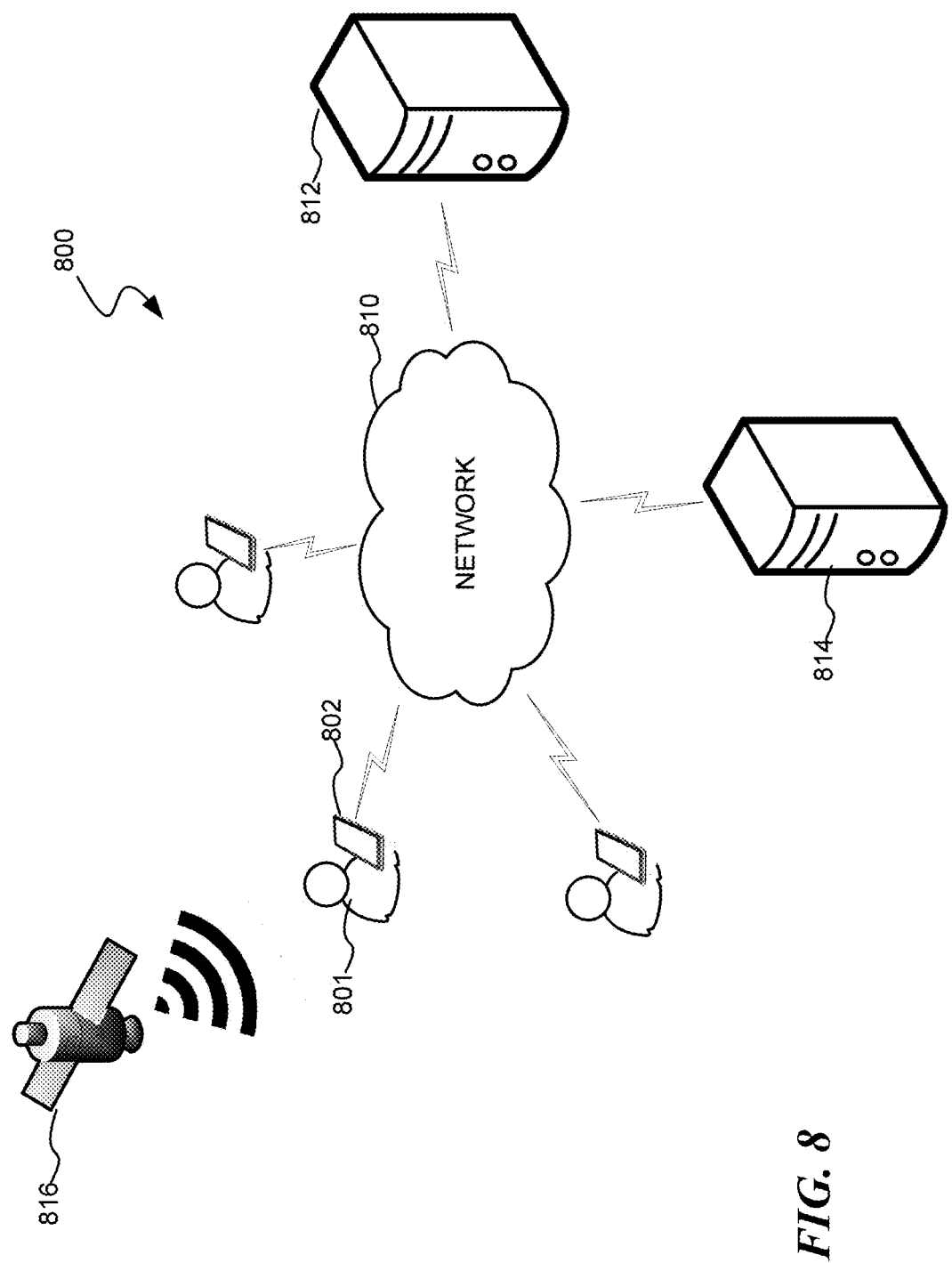
FIG. 8 is a block diagram illustrating an exemplary network environment suitable for implementing aspects of the disclosed subject matter.

Further still, the illustrated computing device 700 includes a network communication component 712 for interconnecting this computing device with other devices and/or services over a computer network, such as network 810 of FIG. 8. The network communication component 712, sometimes referred to as a network interface card or NIC, communicates over a network using one or more communication protocols via a physical/tangible (e.g., wired, optical, etc.) connection, a wireless connection, or both. As will be readily appreciated by those skilled in the art, a network communication component, such as network communication component 712, is typically comprised of hardware and/or firmware components (and may also include or comprise executable software components) that transmit and receive digital and/or analog signals over a transmission medium (i.e., the network.)

In addition to the above, the exemplary computing device 700 also includes an executable web page retrieval module 720, and an executable supplemental content module 724. In various embodiments, the exemplary computing device 700 may also optionally include an executable ad server module 722 and a user location system 726.

With regard to the web page retrieval module 720, in execution the web page retrieval module processes in-store events from one or more participating mobile device users regarding their location within a physical store. In response and as described in regard to routine 400 of FIG. 4, the web page retrieval module 720 receives the in-store events, determines the nature of the in-store event (i.e., moving, stationary, at check-out, etc.), predicts a next location (under certain conditions as described in regard to routine 400), makes implicit requests for a web page corresponding to a location within the physical store on behalf of the participating mobile device user with regard to a location, and returns supplemental content to the mobile device user for presentation. Of course, the web page retrieval module 720 may also operate as a web server in obtaining the web page for the physical location, or rely on an external service that manages the web sites of the physical stores to serve up the requested web page. Additionally, any counting or accounting actions that are applicable to the supplemental content, e.g., counting the presentation/click/conversions of an advertisement, are conducted by the executing web page retrieval module 420. Web pages may be obtained locally, such as within a physical store data store 730, or on a remote device suitable for serving up web pages in response to a request.

The supplemental content module 724, in cooperation with the web page retrieval module 720, is responsible for supplying the supplemental content to the requested web page. In various conditions, the supplemental content module 724 may utilize an executable ad server module 722—which may be local as illustrated in FIG. 7 or may operate as an independent, remote service to the exemplary computing device 700—or provide local content provided from a supplemental data store 728.

Optionally included in the exemplary computing device 700 is an ad server module 722. In execution, the ad server module 722 provides an advertisement service that may use information such as user profile data, content of the requested web page, advertisement campaign information, and the like in providing advertisement based supplemental content to the mobile devices user in response to an implicit request for a web page. Information regarding the user, including (by way of illustration and not limitation) prior locations within the physical store, prior visits to the physical store, visits to related stores, user preferences, loyalty membership information, and the like, may be maintained within the user data store 732.

Still further, a user location system 726 for locating a mobile device user (via the user's mobile device) within the physical store, may also be included and utilized. As suggested above, the user's mobile device may include global positioning satellite services (GPS services) to identify a geo-physical location which can then be mapped to a location within the physical store by the web page retrieval module 720 or, alternatively, by an executable module on the user's mobile device. However, as typical GPS services often fail due to the location being inside, an in-store user location system 726 may be utilized. By way of illustration and not limitation, the user location system 726 may utilize triangulation systems that can triangulate the mobile device from signals received at multiple receivers, signal-strength beacon systems that determine locations according to signal strengths receives at one or more receivers, optical tracking techniques that optically detect the presence of the mobile device at various locations throughout the physical store, proximity detectors that detect the presence of the mobile device when within a predetermined proximity of a proximity detection device, and the like. Typically, though not exclusively, when user location system 726 other than the GPS services of mobile devices is utilized, the user location system 726 may generate the in-store events that are provided to the user's mobile device. Alternatively, when the location of the user is determined by the GPS system (or systems) of the user's mobile device, one or more executable modules generates the in-store events that are then transmitted to the web page retrieval module 720 for processing.

Regarding the various components of the exemplary computing device 700, those skilled in the art will appreciate that many of these components may be implemented as executable software modules stored in the memory of the computing device, as executable hardware modules and/or components (including SoCs—system on a chip), or a combination of the two. Indeed, components may be implemented according to various executable embodiments including executable software modules that carry out one or more logical elements of the processes described in this document, or as a hardware and/or firmware components that include executable logic to carry out the one or more logical elements of the processes described in this document. Examples of these executable hardware components include, by way of illustration and not limitation, ROM (read-only memory) devices, programmable logic array (PLA) devices, PROM (programmable read-only memory) devices, EPROM (erasable PROM) devices, and the like, each of which may be encoded with instructions and/or logic which, in execution, carry out the functions and features described herein.

Moreover, in certain embodiments each of the various components of the exemplary computing device 700 may be implemented as an independent, cooperative process or device, operating in conjunction with or on one or more computer systems and or computing devices. It should be further appreciated, of course, that the various components described above should be viewed as logical components for carrying out the various described functions. As those skilled in the art will readily appreciate, logical components and/or subsystems may or may not correspond directly, in a one-to-one manner, to actual, discrete components. In an actual embodiment, the various components of each computing device may be combined together or distributed across multiple actual components and/or implemented as cooperative processes on a computer network as in known in the art.

Turning now to FIG. 8, FIG. 8 is a block diagram illustrating an exemplary network environment 800 suitable for implementing aspects of the disclosed subject matter. As one or more mobile device users, such as user 801, enters a physical store, the location of the mobile device user is tracked and in-store events are generated based on various conditions as set forth above. The in-store events are then typically transmitted over a network 810 to a store processing server 812 (or servers) which may or may not reside within the physical store. As discussed above, the store processing server 812 may rely upon an external ad service 814 to supply advertisement content in regard to an implicit request for a web page. In the illustrated network environment 800, the various users' mobile devices, such as mobile device 802, may utilize a GPS service 816 in determining the location of the mobile device within the physical store.

While various novel aspects of the disclosed subject matter have been described, it should be appreciated that these aspects are exemplary and should not be construed as limiting. Variations and alterations to the various aspects may be made without departing from the scope of the disclosed subject matter.

What is claimed:

1. A computer-implemented method for processing in-store events regarding the location of a mobile device user within a physical store, the method comprising:

maintaining data regarding a plurality of physical stores, wherein the data comprises, for each of the plurality of physical stores, a web site comprising a plurality of web pages, and each web page corresponding to a distinct location within the physical store, wherein each web page identifies products and services available at a respective distinct location;

receiving a first in-store event regarding the mobile device user, wherein each in-store event, including the first in-store event, comprises identification information that identifies the mobile device user and location information identifying the location of the mobile device user within a physical store;

translating the location information of the first in-store event to a web page of the plurality of web pages corresponding to the physical store; and repeatedly, while the mobile device user is within the physical store:

receiving a subsequent in-store event regarding the mobile device user;

generating an implicit request according to the subsequent in-store event, wherein the implicit request comprises:
mapping the location information of the subsequent in-store event to a web page of the plurality of web pages corresponding to the physical store;
obtaining the mapped web page from the web site corresponding to the physical store;
generating an implicit query to a search engine with regard to data of the obtained web site and obtaining supplemental content as a result of the implicit query, wherein the implicit query is based on a predicted location of the user and the predicted location is determined based on current contents of a shopping cart; and
providing at least a portion of the supplemental content to a mobile device associated with the mobile device user for presentation to the mobile device user.

2. The computer-implemented method of claim 1, wherein a subsequent in-store event includes information indicating that the mobile device user has been stopped at a current location within the physical store; and
wherein translating the location information of the subsequent in-store event to a web page of the web site comprises translating the location information of the subsequent in-store event to a web page of the web site corresponding to the current location.

3. The computer-implemented method of claim 1, wherein the subsequent in-store event includes information indicating that the mobile device user has been stopped at a current location within the physical store for a predetermined threshold amount of time.

4. The computer-implemented method of claim 1, wherein a subsequent in-store event includes information indicating that the mobile device user is moving within the physical store; and
wherein translating the location information of the subsequent in-store event to a web page of the web site comprises:
determining a predicted location of the mobile device user within the physical store; and
translating the location information of the subsequent in-store event to a web page of the web site corresponding to the predicted location.

5. The computer-implemented method of claim 4, wherein determining a predicted location of the mobile device user within the physical store comprises determining the predicted location of the mobile device user within the physical store according to one or more prior locations of the mobile device user within the physical store.

6. The computer-implemented method of claim 5, wherein determining a predicted location of the mobile device user within the physical store further comprises determining the predicted location of the mobile device user within the physical store according to one or more presumed content items of a shopping cart of the mobile device user.

7. The computer-implemented method of claim 1, wherein the supplemental content provided to the mobile device associated with the mobile device user is a loyalty rewards reminder.

8. The computer-implemented method of claim 1, wherein the supplemental content provided to the mobile device associated with the mobile device user is a product reminder.

9. The computer-implemented method of claim 1, wherein the supplemental content provided to the mobile device associated with the mobile device user is an advertisement.

10. The computer-implemented method of claim 9 further comprising counting the provision the supplemental content to the mobile device associated with the mobile device user for presentation to the mobile device user as an advertisement impression.

11. The computer-implemented method of claim 9 further comprising:
receiving an in-store event indicative of user interaction with an advertisement;
counting the user interaction with the advertisement as a user click of the advertisement; and
associating the advertisement with the shopping cart of the mobile device user.

12. The computer-implemented method of claim 1, wherein a subsequent in-store event includes information indicating that the mobile device user is approaching or at a checkout position within the physical store.

13. The computer-implemented method of claim 12 further comprising:
determining a reminder product for the mobile device user according to prior locations of the mobile device user within the physical store and presumed contents of the shopping cart of the mobile device user; and
dynamically incorporating a product reminder corresponding to the reminder product as the supplemental content dynamically added to the translated web page.

14. A computer-readable medium bearing computer-executable instructions which, when executed on a computing system comprising at least a processor, carry out a method for processing in-store events regarding the location of a mobile device user within a physical store, the method comprising:
maintaining data regarding a plurality of physical stores, wherein the data comprises, for each of the plurality of physical stores, a web site comprising a plurality of web pages, and each web page corresponding to a distinct location with the physical store, wherein each web page identifies products and services available at the distinct location;
receiving a first in-store event regarding the mobile device user, wherein each in-store event, including the first in-store event, comprises identification information that identifies the mobile device user and location information identifying the location of the mobile device user within a physical store;
translating the location information of the first in-store event to the plurality of web pages corresponding the physical store; and
repeatedly while the mobile device user is within the physical store:
receiving a subsequent in-store event regarding the mobile device user;
generating an implicit request according to the subsequent in-store event, wherein the implicit request comprises:
mapping the location information of the subsequent in-store event to a web page of the plurality of web pages corresponding to the physical store;
obtaining the mapped web page from the web site corresponding to the physical store;
submitting an implicit query to a search engine according to the contents of the obtained web page, wherein the implicit query is based on a predicted location of the user and the predicted location is determined based on current contents of a shopping cart;

receiving supplemental content from the search engine as a result of the implicit query; and providing at least a portion of the supplemental content to a mobile device associated with the mobile device user for presentation to the mobile device user.

15. The computer-readable medium of claim 14, wherein a subsequent in-store event includes information indicating that the mobile device user has been stopped at a current location within the physical store; and wherein translating the location information of the subsequent in-store event to a web page of the web site comprises translating the location information of the subsequent in-store event to a web page of the web site corresponding to the current location.

16. The computer-readable medium of claim 14, wherein the subsequent in-store event includes information indicating that the mobile device user has been stopped at a current location within the physical store for a predetermined threshold amount of time.

17. The computer-readable medium of claim 14, wherein a subsequent in-store event includes information indicating that the mobile device user is moving within the physical store; and wherein translating the location information of the subsequent in-store event to a web page of the web site comprises:

determining a predicted location of the mobile device user within the physical store; and translating the location information of the subsequent in-store event to a web page of the web site corresponding to the predicted location.

18. The computer-readable medium of claim 17, wherein determining a predicted location of the mobile device user within the physical store comprises determining the predicted location of the mobile device user within the physical store according to one or more prior locations of the mobile device user within the physical store.

19. The computer-readable medium of claim 18, wherein determining a predicted location of the mobile device user within the physical store further comprises determining the predicted location of the mobile device user within the physical store according one or more presumed content items of a shopping cart of the mobile device user.

20. A computer system for processing in-store events regarding the location of a mobile device user within a physical store, the computer system comprising a processor and a memory, wherein the processor executes instructions stored in the memory as part of or in conjunction with additional components to process in-store events, the additional components comprising:

an executable web page retrieval module that, in execution, receives a first in-store event regarding the mobile device user, wherein each in-store event, including the first in-store event, comprises identification information that identifies the mobile device user and location information identifying the location of the mobile device user within a physical store;

translates the location information of the first in-store event to a distinct web page of a web site corresponding the physical store, wherein each web page of the web site identifies products and services available at a respective distinct location; and repeatedly:

receives a subsequent in-store event regarding the mobile device user;

generates an implicit request according to the subsequent in-store event, wherein the implicit query is based on a predicted location of the user and the predicted location is determined based on current contents of a shopping cart, the implicit request comprising:

mapping the location information of the subsequent in-store event to a web page of the web site corresponding to the physical store;

obtaining the mapped web page from the web site corresponding to the physical store;

generates and submits at least one implicit query according to content of the mapped web page;

receiving supplemental content in response to the at least one implicit query; and provides a portion of the supplemental content to a mobile device associated with the mobile device user for presentation to the mobile device user.

* * * * *